US009284623B2

(12) United States Patent
Suzuki et al.

(10) Patent No.: US 9,284,623 B2
(45) Date of Patent: Mar. 15, 2016

(54) RECOVERY OF REUSABLE OSMIUM TETROXIDE

(75) Inventors: Kazushige Suzuki, Hamamatsu (JP); Yoshinori Muranaka, Hamamatsu (JP)

(73) Assignee: National University Corporation Hamamatsu University School of Medicine, Shizuoka (JP)

( * ) Notice: Subject to any disclaimer, the term of this patent is extended or adjusted under 35 U.S.C. 154(b) by 0 days.

(21) Appl. No.: 14/122,266

(22) PCT Filed: May 30, 2012

(86) PCT No.: PCT/JP2012/063998
§ 371 (c)(1),
(2), (4) Date: Feb. 18, 2014

(87) PCT Pub. No.: WO2012/165510
PCT Pub. Date: Dec. 6, 2012

(65) Prior Publication Data
US 2014/0154156 A1 Jun. 5, 2014

(30) Foreign Application Priority Data

May 31, 2011 (JP) .................................. 2011-122388

(51) Int. Cl.
*C01G 55/00* (2006.01)
*C22B 3/00* (2006.01)
*C02F 1/78* (2006.01)
*C02F 101/20* (2006.01)

(52) U.S. Cl.
CPC ............ *C22B 11/042* (2013.01); *C01G 55/004* (2013.01); *C02F 1/78* (2013.01); *C02F 2101/20* (2013.01)

(58) Field of Classification Search
None
See application file for complete search history.

(56) References Cited

U.S. PATENT DOCUMENTS

| | | | |
|---|---|---|---|
| 3,317,592 A | 5/1967 | Maclean et al. | |
| 3,927,168 A | 12/1975 | Whitehead et al. | |
| 4,217,291 A * | 8/1980 | Wu et al. ........................ | 556/137 |
| 5,248,496 A | 9/1993 | Schuster et al. | |
| 2004/0202593 A1 | 10/2004 | Phillips et al. | |
| 2009/0191106 A1 | 7/2009 | Meyer et al. | |

FOREIGN PATENT DOCUMENTS

| | | | |
|---|---|---|---|
| FR | 2360348 A1 | | 3/1978 |
| GB | 1078453 | * | 8/1967 |
| GB | 1152565 | | 5/1969 |
| JP | 46-042708 | | 12/1971 |
| JP | 64-056831 | | 3/1989 |
| JP | H10-273327 A | | 10/1998 |
| JP | H10-283327 | | 10/1998 |
| JP | 2001-284317 | | 10/2001 |
| JP | 2005-239441 | | 9/2005 |
| JP | 2009-179551 | | 8/2009 |
| JP | 2011-201862 | | 10/2011 |
| RU | 2148095 C1 | | 4/2000 |

OTHER PUBLICATIONS

Translation of RU-2148095, Apr. 2000.*
Translation of JP 64-056831, Mar. 1989.*
Ushinskaya et al., Optimization of Gas-Extraction Recovery of Osmium Tetroxide from Aqueous Solutions. Russian J Appl Chem. Dec. 2003;76(12):1896-1899.
[No Author Listed], Geology and minerals: abundance ratio of elements. National Institute of Natural Sciences, National Astronomical Observatory of Japan (Ed.). Chronological Scientific Tables (H22), Maruzen, 2009:632.
[No Author Listed], Osmium Tetroxide. Society for Electron Microscopy Technology for Medicine and Biology [Igaku Seibutsugaku Denshikenbikyou Gijutsu Kenkyukai] (Ed.), Yokuwakaru Densikenbikyou Gijutsu, Asakura Shoten, 1992:4-5.
Abe et al., Recovery Procedure of Osmium Tetroxide. Saibou, 1982;14 (4):39-43.
Emi et al., Recycling osmium metal from osmium-containing waste liquid. General presentations (presentations on studies and accomplishments) speech abstracts. The Mining and Materials Processing Institute of Japan (Ed.), 1997:107.
Emi et al., Treatment of osmium waste liquid and analysis of osmium. Newsletter of Council of Waste Disposal Facility in Universities. 1991; 8 (1):86-91.
Murakami, Solidification with tannic acid: a simple method for treating laboratory waste liquid. Microscopia, 1997;14(3):60-62.

* cited by examiner

*Primary Examiner* — Steven Bos
(74) *Attorney, Agent, or Firm* — Wolf, Greenfield & Sacks, P.C.

(57) ABSTRACT

The present invention enables simple production of osmium tetroxide having comparable performance to that sold in reagents from a solution containing osmium. The present invention relates to a method for producing osmium tetroxide solution, the method comprising a step for using ozone or a similar oxidizing gas to oxidize a solution containing osmium and produce osmium tetroxide gas and a step for introducing the resulting osmium tetroxide gas into a recovery solution; the present invention further relates to a production apparatus therefor.

3 Claims, 9 Drawing Sheets

RECOVERY OF REUSABLE OSMIUM TETROXIDE

RELATED APPLICATION

This application is a national stage filing under 35 U.S.C. §371 of international application PCT/JP2012/063998, filed May 30, 2012, the disclosure of which is incorporated by reference herein in its entirety.

TECHNICAL FIELD

The present invention relates to a method of producing oxidation gas such as ozone from liquid containing osmium (e.g., waste liquid) and to a method of producing an osmium (VIII) oxide solution, osmium (VIII) oxide-containing solid material or osmium (VIII) oxide crystal using said gas.

BACKGROUND ART

Osmium is a rare element as gold and silver and present at only approximately 4 ppb on the earth (Non-patent publication 1). Osmium is also considerably maldistributed (Non-patent publication 2). Its oxidation product osmium (VIII) oxide is used as an oxidant in organic synthesis, and for fixation and staining in sample preparation for electric microscopy, though it is rather expensive (Non-patent publication 3). For many commercial waste disposers it is often difficult to handle the osmium-containing waste liquid discharged from sample preparation for electric microscopy due to following reasons: osmium (IV) oxide contained in such waste liquid is not easily precipitated; the waste liquid contains organic materials such as body tissue; and a highly toxic osmium (VIII) oxide gas, whose tolerable concentration is as low as 0.002 mg/m$^3$, could volatilize during the processing of the waste liquid. For these reasons, waste liquid has been stored in many research institutes. For instance, in Hamamatsu University School of Medicine approximately 100 L of waste liquid has been stored.

For a method of processing at laboratory level, for example, Non-patent publication 4 examines a method of solidification with tannic acid for storing, and Non-patent publication 5 examines a method of reduction and precipitation as metal osmium (0).

However, either method requires complicated operations for solidification of osmium, and thus processed osmium cannot be reused and has no other way than to be stored as solid waste.

For reutilization of osmium, Non-patent publication 6 describes a method in which osmium (IV) oxide is extracted from the waste liquid with carbon tetrachloride, adsorbed onto glass wall and removed to give osmium (IV) oxide, which is dissolved in water before use and is oxidized by the addition of hydrogen peroxide to give osmium (VIII) oxide, the later is to be reused. However, this method requires employment of toxic materials, and also requires complicated operations for solidification and use after solidification.

Non-patent publication 7 describes a method in which osmium waste liquid is reduced and resulted osmium (0) is separated by centrifugation, then the precipitate is dissolved in hydrogen peroxide solution, and potassium peroxydisulfate is added thereto, which is then oxidatively distilled on heating to generate 1% osmium (VIII) oxide solution. However, this method uses a wide variety and a large amount of reagents (e.g., to 450 ml of waste liquid, 54 g of potassium peroxydisulfate is added as an oxidant), and requires complicated operations ranging from reduction to oxidative distillation.

As described above, although osmium (VIII) oxide is an extremely important and rare material across many fields, it is generally stored in solidified form after use, and no effective method for reuse has been established so far.

On the other hand, ozone is widely used for its strong oxidizability in, such as, sterilization or antisepsis in effluent treatment or in deodorization of emission. Patent publication 1 describes a method for processing a solid surface by supplying the solid surface which contains either ruthenium or ruthenium oxide or osmium or osmium oxide with oxygen atom-donating gas such as ozone, generating a ruthenium compound or osmium compound having a high vapor pressure, and thereby etching the solid surface with it. However, there is no description about recovery of osmium (VIII) oxide in this publication.

In addition, Patent publication 2 which was published after the priority date of the present application describes a method of producing magnetic nanoparticle-fixed osmate (VI) salt, which can be recovered by bringing a magnet close to it after reaction and reused as a reusable fixed osmium oxide catalyst. However, this publication does not describe about recovering osmium (VIII) oxide itself.

REFERENCE LIST

Patent Publication

[Patent publication 1] JPA 2001-284317
[Patent publication 2] JPA 2011-201862

Non-Patent Publication

[Non-patent publication 1] National Institute of Natural Sciences, National Astronomical Observatory of Japan (Ed.), Chronological Scientific Tables (H22), Maruzen, 2009, p. 632

[Non-patent publication 2] Ooki M., Oosawa T., Tanaka M. and H. Chihara (Eds.), Encyclopedic dictionary of chemistry, Tokyo Kagaku Dojin, 1989, p. 362

[Non-patent publication 3] Society for Electron Microscopy Technology for Medicine and Biology [Igaku Seibutsugaku Denshikenbikyou Gijutsu Kenkyukai] (Ed.), YOKU-WAKARU DENSIKENBIKYOU GIJUTSU, Asakura Shoten, 1992, p. 4-5

[Non-patent publication 4] Murakami T., "A simple method for treating laboratory waste liquid", *Microscopia*, 1997, Vol. 14, No. 3, p. 60-62

[Non-patent publication 5] Emi S. and H. Watanabe, "Treatment of osmium waste liquid and analysis of osmium", *Newsletter of Council of Waste Disposal Facility in Universities* [Daigaku tou haikibutsu shori shisetsu kyougikai kaihou], 1991, 8, (1), p. 86-91

[Non-patent publication 6] Abe K., Sekiguchi M., Nagao H. and M. Okano, "Method of Regenerating Osmium tetraoxide", *Saibou*, 1982, 14, (4), p. 39-43

[Non-patent publication 7] Emi S., Oonuma H. and Tanaka N., A study on the recycle of osmium metals from osmium-containing waste liquid", General presentations (presentations on studies and accomplishments) speech abstracts, The Mining and Materials Processing Institute of Japan (Ed.), 1997, p. 107

SUMMARY OF THE INVENTION

Problems to be Solved by the Invention

As described above, since a simple and safe method for recovering and regenerating osmium (VIII) oxide has yet to be developed, the object of the present invention is firstly to provide a method for producing osmium (VIII) oxide in a reasonable manner, thereby providing a method for recovering, regenerating and reusing osmium (VIII) oxide, whose recovery and regeneration have been difficult, in a simple and safe manner.

Means for Solving the Problems

On the course of intensive studies for solving the above-mentioned problems, the inventors found that a solution of osmium (VIII) oxide that has compatible performances to an expensive commercial reagent and reusable in sample preparation for electric microscopy can be produced by oxidizing an osmium-containing liquid with ozone and recovering resulted osmium (VIII) oxide gas, thus completed the present invention.

Accordingly, the present invention relates to followings:
(1) A method of producing osmium (VIII) oxide gas, comprising a step of oxidizing a liquid containing osmium using an oxidation gas.
(2) The method according to (1), wherein the oxidation gas is ozone.
(3) The method according to (1) or (2), wherein the oxidation temperature is set firstly in a range from 10° C. to 30° C., and secondly in a range from 70° C. to 80° C.
(4) The method according to any one of (1) to (3), comprising a step of concentrating the liquid containing osmium before oxidation.
(5) A method of producing osmium (VIII) oxide solution, further comprising a step of introducing the gas produced by the method according to any one of (1) to (4) into a recovery solution.
(6) The method according to (5), wherein the recovery solution is alkaline, and the temperature of said recovery solution is below room temperature.
(7) An osmium (VIII) oxide solution prepared by the method according to (5) or (6), wherein the pH of the solution is from 7 to 10.
(8) The osmium (VIII) oxide solution according to (7) which is to be used for electric microscopy sample preparation, catalysis, organic synthesis or fingerprint detection.
(9) A method of producing osmium (VIII) oxide-containing solid material, further comprising a step of introducing the gas prepared by the method according to any one of (1) to (4) into a solid material for recovery.
(10) A method of producing an osmium (VIII) oxide crystal, further comprising a step of crystallizing the gas prepared by the method according to any one of (1) to (4).
(11) A device for producing an osmium (VIII) oxide solution, osmium (VIII) oxide-containing solid material or osmium (VIII) oxide crystal, the device comprising an oxidation part that oxidizes osmium-containing liquid, an oxidation gas supplying part that supplies the oxidation part with an oxidation gas, a recovery part that recovers osmium (VIII) oxide gas generated within the oxidation part.
(12) A method of regenerating a solution discharged through sample preparation for electric microscopy, comprising a step of oxidizing a liquid containing osmium using an oxidation gas, and a step of introducing the osmium (VIII) oxide gas generated by the previous step into a recovery solution to produce a osmium (VIII) oxide solution.
(13) The method according to (12), further comprising a step of adding water and/or buffer.

Effects of the Invention

According to the method of the present invention, a useful octavalent osmium oxide can be prepared or regenerated from a solution containing osmium such as, for example, an osmium-containing liquid discharged through the sample preparation for electric microscopy using a simple device. The osmium (VIII) oxide solution produced according to the present invention can be used again in, such as, electric microscopy sample preparation, catalysis, organic synthesis and fingerprint detection, with compatible performances to a commercially available reagent. Moreover, when using ozone as an oxidant, ozone is naturally decomposed, discharging no harmful post-treatment waste, such as oxidation used chemicals, and requiring no further treatment. Furthermore, the method does not require any complicated operation but monitoring of the reaction, except at the time of setting and termination.

The method of the present invention not only enables the treatment of an osmium waste liquid and reuse of osmium (VIII) oxide for electric microscopy sample preparation in research institutes such as universities, but also enables making a sale of the osmium (VIII) oxide solution produced by the method of the present invention as a reagent used in catalysis, organic synthesis or fingerprint detection, and an application for extraction and purification of osmium from ore and thereby contributing to techniques for regenerating and recovery of rare metals.

MODES FOR CARRYING OUT THE INVENTION

Figure 1:
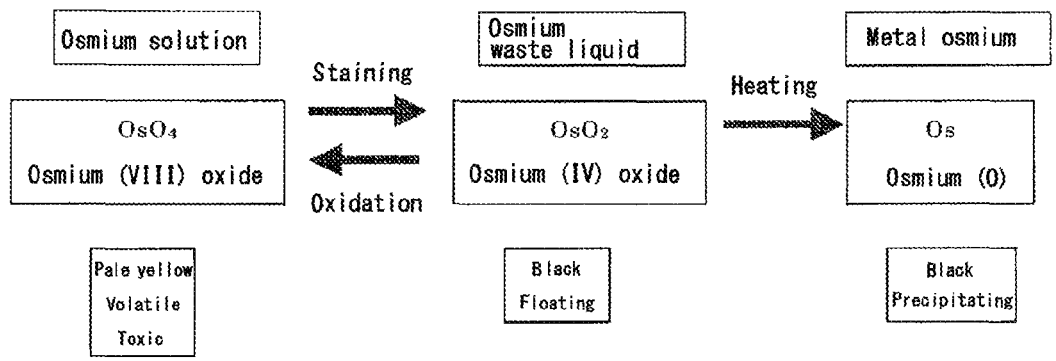
FIG. 1 is a diagram showing the presumption of osmium state.

The present invention relates to, in one aspect a method of producing osmium (VIII) oxide gas, comprising a step of oxidizing a liquid containing osmium with an oxidant, specifically an oxidation gas such as ozone.

In another aspect, the present invention relates to a method of producing an osmium (VIII) oxide solution by taking said osmium (VIII) oxide gas into a recovery solution, a method of producing an osmium (VIII) oxide-containing solid material by taking said gas into a solid material for recovery, and a method of producing an osmium (VIII) oxide crystal by crystallizing said gas.

In the present invention, the liquid containing osmium is not particularly limited as long as it is a liquid containing osmium, including any waste liquid resulted from use of osmium. A liquid containing osmium includes, for example, an waste liquid resulted from electric microscopy sample preparation of a polymer material or biosample, an waste liquid or solution resulted from organic synthesis using osmium as catalyst, and an waste liquid or solution of ore comprising osmium. In the present invention, a liquid containing osmium also comprises those which have been diluted with water, etc.

In the present invention, an oxidant can be any one that is capable of oxidizing osmium and includes any oxidizing reagent such as Category I materials defined by Fire Service Act (oxidizing solids), e.g., permanganate salts, chromate salts, dichromate salts, chlorate salt, perchlorate salts, chlorite salts and nitrate salts; Category VI materials defined by Fire Service Act (oxidizing liquids), e.g., nitric acid, hydrogen peroxide and hypochlorite salts of other oxidizing liquids. When an oxidizing reagent is added, it is desired to supply separately air or oxygen.

Also, an oxidation gas includes such as ozone, chlorine, nitrogen oxide, hydroxy gas, in which case there is no need to supply a liquid containing osmium with anything but the oxidation gas.

Potassium permanganate and potassium chromate may also be used as oxidants, although when the oxidation is carried out by adding these (including oxidation of organic materials included in the waste liquid) approximately 1 g of reagent will be required 100 ml of the waste liquid. For example, when using potassium chromate and potassium dichromate, a large amount of waste liquid containing toxic chrome is produced. Assuming the water content being 90%, approximately 10 v/v % of the waste has to be processed after recovering osmium When using potassium peroxydisulfate, approximately 10 g of the reagent is necessary for 100 ml of the waste liquid. When using nitrate or chlorine, it is likely that nitrogen oxide or chlorine is generated.

When using ozone as an oxidant, nothing more than the injection of ozone is required, and no aftertreatment is necessary because ozone will be decomposed in about 1 hour at room temperature. Therefore, ozone is particularly preferred from the viewpoint of the ease of operation and reduction of environmental burdens.

Moreover, since ozone is capable of preferentially decomposing organic materials, ozone has an advantage that, even if the waste liquid contains several % of organic materials in such as tissue, aldehyde or ethanol, it is only necessary to extend the ozone injection time, and that there is no need for preliminary adjustment of the oxidizing reagent, and that the liquid volume will not be increased, and that the amount of ozone can be adjusted on the course of the treatment depending on the situation of the oxidation.

The present invention may be applied via such as a system which generates ozone from oxygen, a system which generates ozone from air, or a system using chlorine or other oxidation gas. Among these systems, osmium (VIII) oxide solution produced by a system which generates ozone from air or a system using an oxidation gas such as chlorine likely to contain nitrate or chlorine, which may have some influence when being used for electric microscopy sample preparation. In the case when produced osmium (VIII) oxide solution is intended to be used for electric microscopy sample preparation, it is preferred to use a system which generates ozone from oxygen.

When a liquid containing osmium is oxidized with ozone and recovered using water, the osmium (VIII) oxide concentration of the recovered solution is about 0.3 w/v %.

Usually, in order to prepare an electric microscopy sample, typically 50% of pH buffer is added in an osmium (VIII) oxide solution immediately before use to prepare 1 w/v % osmium (VIII) oxide solution whose pH was been adjusted to pH 7.4 for use. Therefore, in this case, it is desirable to prepare 2 w/v % osmium (VIII) oxide solution.

In general, ozone generator run a source gas such as oxygen or air to generate ozone in the source gas. In the present invention, ozone supplying such as ozone injection is typically carried out by supplying a gas containing ozone, although this is not limiting.

The flow of ozone-containing gas may appropriately set according to the volumes and shapes of constituents such as the reactor and recovery vessel, and the volume of liquid placed in a vessel. By increasing the amount of injected ozone, recoverable osmium (VIII) oxide concentration will increase. The amount of ozone is preferably 0.1 g/hour or more, more preferably 1 g/hour or more, further preferably 2 g/hour or more. The yield of ozone and the flow of ozone-containing gas varies depending of the ozone generator. However, when the gas flow is considerably increased, the liquid will significantly bubble and flown away as droplets. When using a recovery solution for recovery, for example, these droplets will contaminate recovery solution. It is therefore preferred to appropriately set the flow of ozone-containing gas in view of suppressing liquid droplets and the yield of ozone.

Preferred examples of the flow of ozone-containing gas is, but not limited to, from 0.2 to 3.0 L/min (ozone yield=1 g/hour to 6 g/hour), more preferably from 0.5 to 2.0 L/min (ozone yield=2 g/hour to 5.5 g/hour), further preferably from 0.5 to 1.0 L/min (ozone yield=2 g/hour to 5 g/hour).

In one embodiment of the present invention, the recovery rate from the production of an osmium (VIII) oxide solution may be improved by visually observing the oxidative state of the osmium-containing waste liquid and appropriately adjusting the temperature. In an waste liquid containing osmium, osmium is floating as osmium (IV) oxide which makes the color of the liquid black as a whole. As oxidation proceeds, it becomes osmium (VIII) oxide and the solution turns transparent. The transparency here refers to the state of the solution in which the black color fades away and the solution turns pale yellow and the background of the vessel can be seen.

Reaction temperature is not particularly limited, although there is no need to boil. When using ozone, a typical reaction temperature is from 10° C. to 60° C. because ozone is easily decomposed at a high temperature as 60° C. or higher. The recovery rate of osmium (VIII) oxide increases with decreasing reaction temperature during the time till the solution turns from black to transparent. Therefore, reaction temperature is preferably from 10° C. to 60° C., more preferably from 10° C. to 40° C., further preferably from 10° C. to 30° C. It is very advantageous that the oxidation can efficiently be performed at room temperature in terms of safety, ease and energy.

On the other hand, about 30 to 80% of osmium remains even after the liquid becomes transparency. In order to volatilize osmium (VIII) oxide generated after transparency, a higher recovery rate is achieved by increasing the temperature. Therefore, although the temperature may be room temperature after transparency, it is preferred to be from 50° C. to 100° C., preferably from 60° C. to 100° C., further preferably from 70° C. to 80° C. for safety, etc.

Therefore, in a preferred embodiment of the present invention, the reaction temperature for a liquid containing osmium is at first from 10° C. to 30° C., and from 70° C. to 80° C. after the color of the osmium-containing liquid turns from black to transparent.

When ozone is used as oxidant, the recovery rate will be low if the temperature until transparency is high. This is assumed to be because ozone is easily decomposed at a high temperature as 60° C. or higher and more stable at lower temperature as 40° C. or lower. On the other hand, the recovery rate increases with increasing temperature after transparency because osmium in post-transparency solution is at the state of osmium (VIII) oxide, which is more volatile at a higher temperature.

Also, when being heated, osmium (IV) oxide and osmium (VIII) oxide is decomposed and is generated osmium (0), which is easily precipitated. It is therefore preferable to continue the oxidation reaction and to maintain the oxidative state during heating. When using ozone as oxidant, ozone will easily be decomposed at 60° C. or higher post-transparency temperature. However, by continuously injecting ozone, the generation of osmium (0) can be suppressed.

Time to transparency may be appropriately set depending on reaction conditions such as liquid volume or ozone flow. However, if ozone is injected extendedly after the liquid becomes transparent, more osmium (VIII) oxide will remain unrecovered as ozone injection continues, decreasing the concentration of recoverable osmium (VIII) oxide. It is preferred to raise the temperature from 70° C. to 80° C. immediately after transparency, as well as to set the amount of injected ozone-containing oxygen to be the lowest amount with which ozone can be generated.

Here, time required to reach transparency is preferably 4 to 10 hours, more preferably 4 to 7 hours. On the other hand, time for post-transparency treatment is preferably 1 to 3 hours, more preferably 1 to 2 hours.

Although the recovery rate tends to be decreased by adjusting the pH of the osmium-containing liquid to acidic before the oxidizing step by ozone, time to transparency will be shorter. Therefore, in terms of shortening time for ozone treatment, pH is preferably from 1 to 3, more preferably 2 or lower, although it may be appropriately set considering a balance between the recovery rate and time saving.

The osmium concentration of the waste liquid comprising osmium discharged from sample preparation for electric microscopy is generally 0.2 w/v % or lower. Assuming that the concentrating rate in the system to regenerate and produce 2 w/v % osmium (VIII) oxide solution is about 3-fold, it is preferred to concentrate the waste liquid to osmium concentration of approximately 0.5 w/v % before the step of ozone oxidation.

For a method for concentration, concentration by water evaporation without heating is desirable. Those which have been concentrated by heating do not turn transparent upon being oxidized with ozone. Osmium (IV) oxide is predominant in the state of waste liquid, taking on black color. When the liquid in this state is heated, osmium (IV) oxide is decomposed to generate osmium (0) which is more likely to be precipitated, making it difficult to generate osmium (VIII) oxide.

Since osmium (IV) oxide, the main constituent in waste liquid, is not volatile, water content can be evaporated by placing the liquid in a shallow and broad container and leaving it at room temperature.

Also, reduced-pressure concentration and the like may be applied without heating.

In the present invention, recovery of osmium (VIII) oxide gas may be carried out by a method in which osmium (VIII) oxide gas is introduced into a recovery solution, a method in which osmium (VIII) oxide gas is introduced into a solid material for recovery, or a method in which osmium (VIII) oxide gas is crystallized. The recovery solution in the present invention typically comprises water. In particular, water is preferred for a use in sample preparation for electric microscopy and the like. Depending on intended use of osmium (VIII) oxide solution to be produced, any ingredients such as a pH adjusting agent, other oxidants such as chlorine, a diluent and solvent may appropriately be added to recovery solution.

A solid material for recovery in the present invention includes, but not limited to, e.g., an absorbent such as silica gel, alumina and activated carbon.

A method for crystallizing osmium (VIII) oxide gas in the present invention includes, for example, a method in which an empty recovery vessel is cooled to approximately 0° C., preferably 0° C. or below, using such as dry ice, on which osmium (VIII) oxide crystal is precipitated.

Because the recovery rate increases with increasing alkalinity, pH of the recovery solution is preferably from 9 to 14, particularly preferably from 10 to 13, although it may be appropriately be set depending on intended use of osmium (VIII) oxide solution to be produced.

A pH adjusting agent includes an alkaline ingredient such as, without limitation, e.g., an alkaline metal hydroxide such as sodium hydroxide, potassium hydroxide and lithium hydroxide, an alkaline earth metal hydroxide such as calcium hydroxide, and an ammonia water. In particular, sodium hydroxide, potassium hydroxide, etc. are preferred since they do not generate precipitation and do not react with osmium (VIII) oxide.

Moreover, an acidic ingredient includes, but not limited to, an acid such as carbon dioxide, sulfuric acid and hydrochloric acid.

Although a phosphate buffer at pH 7.4 which is added during preparation of electric microscopy sample might be used directly as a recovery solution, it is not preferable for long-term storage for use in electric microscopy sample preparation because osmium (VIII) oxide is reacted with phosphate in long term.

When it is intended to utilize osmium (VIII) oxide solution to be produced for electric microscopy sample preparation, it is desirable that its alkalinity is not high. Therefore, pH of the recovery solution is preferably from 4 to 11, more preferably from 5 to 10, further preferably from 7 to 10, even if it declines after the termination of the step of ozone oxidation due to osmium (VIII) oxide gas or carbon dioxide gas generated during the reaction. Namely, for instance, in the case of sodium hydroxide, it is preferably added to the recovery solution before the step so that its concentration is about 0.01 N to 1 N. Preferably, pH of the recovery solution does not change even if phosphate buffer pH 7.4 is added at 50%. Preferably, pH of the osmium (VIII) oxide solution after the termination of the step is from 7 to 10. In this pH range, pH does not change from 7.4 even if phosphate buffer pH 7.4 is added at 50%, and therefore desired pH is easily achieved.

However, if pH of the produced osmium (VIII) oxide solution is not within the range from 7 to 10, the pH is adjusted to be from 7 to 10 with a diluted aqueous solution of inorganic acid such as sulfuric acid or hydrochloric acid if it is alkaline, and with a dilute aqueous solution of inorganic alkaline such as sodium hydroxide and potassium hydroxide if it is acidic.

The temperature of the recovery solution may appropriately set by a person with ordinary skill in the art, and typical temperature is from 0° C. to 40° C., though it is preferably from 0° C. to 30° C., more preferably from 0° C. to 20° C., further preferably from 0° C. to 10° C., because the recovery rate of osmium (VIII) oxide increases with decreasing temperature. In a preferred embodiment of the present invention, a recovery solution is cooled below room temperature, to 10° C. or below.

The method of producing an osmium (VIII) oxide solution according to the present invention may further comprise steps of adjusting pH, concentrating or diluting, a step of adding any ingredients and a step or purification, etc., after the steps of producing the osmium (VIII) oxide solution, depending on the intended use.

For example, if it is to be used in electric microscopy sample preparation, water and phosphate buffer are added to the produced osmium (VIII) oxide solution to produce an osmium (VIII) oxide composition with desired concentration and pH.

Because the method for production according to the present invention is associated with toxic volatilized osmium (VIII) oxide, the whole oxidation treatment is preferably carried out inside a fume hood with countermeasures for ozone discharge. Each gas-cleaning bottle should carefully be opened at the termination of oxidation.

As described above, pH adjusting agent etc. can be added to the recovery solution in order to improve recovery rate of osmium (VIII) oxide, a osmium (VIII) oxide solution produced by the above-mentioned method for production according to the present invention may comprise ingredients which are not contained in commercially available osmium (VIII) oxide reagents. When using ozone as oxidant and adding sodium hydroxide as pH adjusting agent to the recovery solution, carbon dioxide that has been generated by oxidation of organic material in the liquid will react with sodium hydroxide and generate sodium carbonate. Since the amount of generated sodium carbonate depends on the amount of added sodium hydroxide, it is considered that approximately 0.1 N (approximately 0.5 w/v %) of sodium carbonate would be contained by using approximately 0.1 N of sodium hydroxide.

When it is used for electric microscopy sample preparation, such alkaline metal carbonate salts such as sodium carbonate does not have any influence on the electric microscopy sample preparation. An alkaline metal carbonate salt includes those which correspond to the alkaline metal hydroxide added as pH adjusting agent, such as sodium carbonate, sodium hydrogen carbonate, potassium carbonate, potassium hydrogen carbonate, lithium carbonate, and those which correspond to the alkaline earth metal hydroxide such as calcium carbonate.

Further aspect of the present invention relates to a device for producing an osmium (VIII) oxide solution, osmium (VIII) oxide-containing solid material or osmium (VIII) oxide crystal, the device comprising an oxidation part that oxidizes osmium-containing liquid, an oxidation gas supplying part that supplies the oxidation part with the oxidation gas, a recovery part that recovers osmium (VIII) oxide gas generated in the oxidation part. Further aspect of the present invention relates to a system for regenerating an osmium (VIII) oxide solution, wherein the liquid containing osmium is an waste liquid containing osmium.

An oxidation part has a reactor to accommodate a liquid containing osmium. A reactor is not particularly limited and may be a vessel of various materials and in which a gas and a liquid are brought into contact, such as a gas-cleaning bottle or trap made of generally used glass or of plastic or metal which does not deteriorate by osmium (VIII) oxide. The volume of a reactor and the amount of liquid to be treated may appropriately be set according to the scale of the production device. When it is used at laboratory level, it is preferably from 100 ml to 2 L, more preferably from 100 ml to 1 L, further preferably from 200 ml to 1 L. Although the reactor volume may appropriately be set according to the liquid, it is preferred that the reactor volume is about two times as large as the amount of the liquid in terms of preventing the generation of droplets of the liquid. It is preferred that the reactor volume is from 200 ml to 1 L when the amount of the liquid is from 100 ml to 500 ml.

An oxidation gas supplying part may be provided with a system which directly supplies an oxidation gas via a bomb and a system which generates an oxidation gas such as ozone.

A recovery part has a recovery vessel which recovers osmium (VIII) oxide gas. A recovery vessel is not particularly limited and may be a vessel of various materials in which a gas and liquid or solid material for recovery are brought into contact, such as a gas-cleaning bottle or trap made of generally used glass or of plastic or metal which does not deteriorate by osmium (VIII) oxide.

Figure 2:
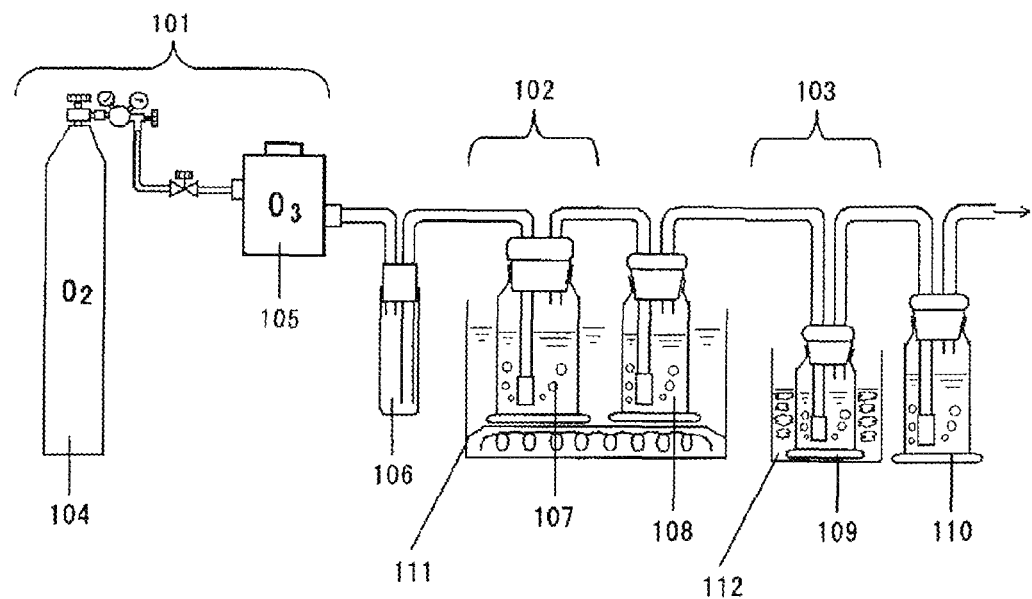
FIG. 2 is a schematic of an osmium (VIII) oxide producing device (regeneration system) in a suitable embodiment of the present invention.

A schematic diagram of the osmium (VIII) oxide solution production device (regeneration system) according to a suitable embodiment of the present invention is indicated in FIG. 2.

In a suitable embodiment of the present invention, the production device comprises an oxidation gas supplying part which has a oxygen bomb and an ozone generator, a vessel for backflow prevention, an oxidation part having a reactor, cleaning part A, a recovery part, and cleaning part B.

A vessel for backflow prevention is not particularly limited and may be a commercially available vessel for backflow prevention.

A vessel used for cleaning part A is not particularly limited and may be a vessel of various materials in which a gas and liquid are brought into contact, such as a gas-cleaning bottle or trap made of generally used glass or of plastic or metal which does not deteriorate by osmium (VIII) oxide.

An oxidation part and cleaning part A can be heated. A heating system is not particularly limited as long as it is capable of heating the oxidation part and cleaning part A. Examples include an isothermal bath, an water bath and a temperature-controlled heater. Added to cleaning part A are a reagent that is considered to have a function of removing an acidic gas which could be generated from the liquid or a nitrogen-containing component (nitrogen oxide: nitric acid)

generated from a biosample contained in the liquid. The reagent may be water or an absorbent having a similar effect.

A recovery part provides a temperature controlling system, which is not particularly limited. For example, a recovery vessel may be cooled with ice or dry ice, or alternately a recovery bottle may be installed in a cooling device such as a low-temperature isothermal bath, a cooling water circulating device or a heat pump.

A vessel used for cleaning part B which follows the recovery part is not particularly limited and may be a vessel of various materials in which a gas and liquid are brought into contact, such as a gas-cleaning bottle or trap made of generally used glass or of plastic or metal which does not deteriorate by osmium (VIII) oxide. Added to cleaning part B are a reagent that has a function of absorbing osmium (VIII) oxide gas and/or ozone gas which cannot be completely absorbed within the recovery part. The reagent may be a liquid absorbent such as water or a solid absorbent such as activated carbon.

Each part may be an independent instrument or may form an integrated device. Therefore, a production device or regeneration system of the present invention means a combination of parts as well as an integrated device.

The production device and regeneration system of the present invention have been explained in detail based on suitable embodiments, though the present invention is not limited thereto. For example, each constituent can be substituted with any constituent that is capable of exerting similar function, or any constituents can be added.

WORKING EXAMPLES

The concentration of osmium was measured through Working Examples 1 to 11 by the method described in Non-patent publication 5. Namely, samples were oxidized with potassium dichromate under sulfuric acid condition in and distilled, reacted with thiourea in sulfuric acid for colorization, and the absorbance was measured at 480 nm. Because this thiourea in sulfuric acid only reacts and forms color with osmium (VIII) oxide among osmium, samples were not distilled and directly reacted for colorization with thiourea in sulfuric acid when only osmium (VIII) oxide was measured.

Figure 3:
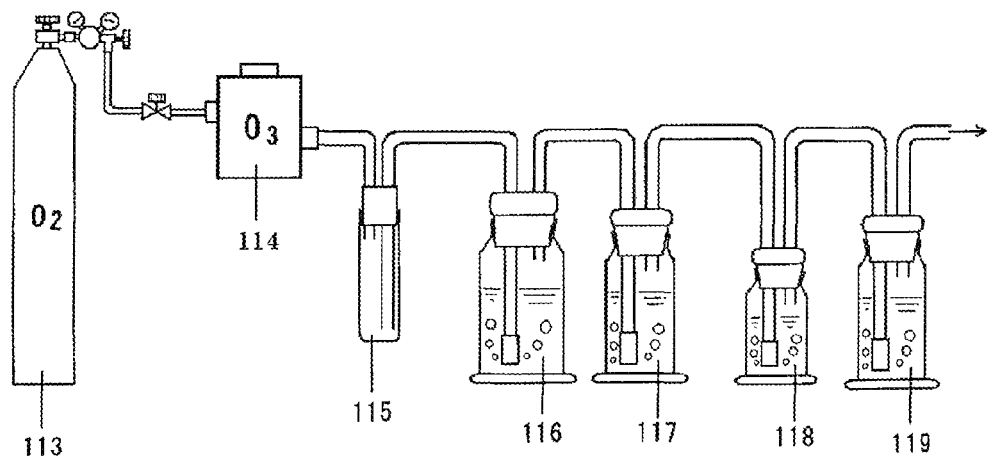
FIG. 3 is a schematic of an osmium (VIII) oxide producing device (regeneration system) in one embodiment of the present invention

The schematic diagram of the osmium (VIII) oxide production device used in Working Examples 1 to 10 is shown in FIG. 3. In Working Example 1 to 10, unless otherwise stated, following operation conditions are commonly used.

For waste liquid, osmium waste liquid discharged from sample preparation for electric microscopy was used directly. 300 ml of waste liquid was placed in the reactor. 70 ml of water was placed in the recovery bottle as the recovery solution. 150 ml of water was placed in each of cleaning part A and cleaning part B.

Figure 4:
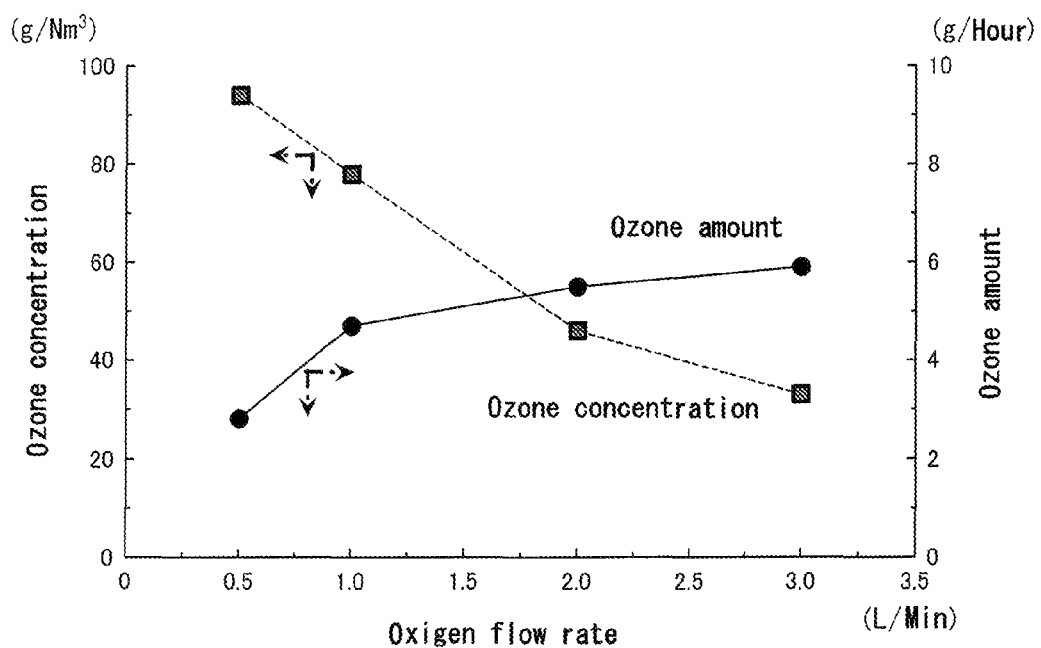
FIG. 4 is a diagram showing the performances of the ozone generator.

For the oxidation gas supplying part, an oxygen bomb and a highly functional ozone generator manufactured by HAMANETSU Co., Ltd. were used. As an ozone generating device cools the heat of the device itself using the source gas, it cannot generate ozone at low flow. The highly functional ozone generator used as osmium (VIII) oxide production device in Working Examples is capable of generating ozone at the yield of 2 g/hour even from an oxygen flow as low as 0.5 L/min. Taking into account the performance of the ozone generator (FIG. 4), the scale of the production device, the amount of generated ozone, and suppressing the generation of droplets of waste liquid, the yield of ozone was estimated to be 5 g/hour (oxygen flow=1 L/min).

Working Example 1

Effects of Ozone as an Oxidant

Figure 5:
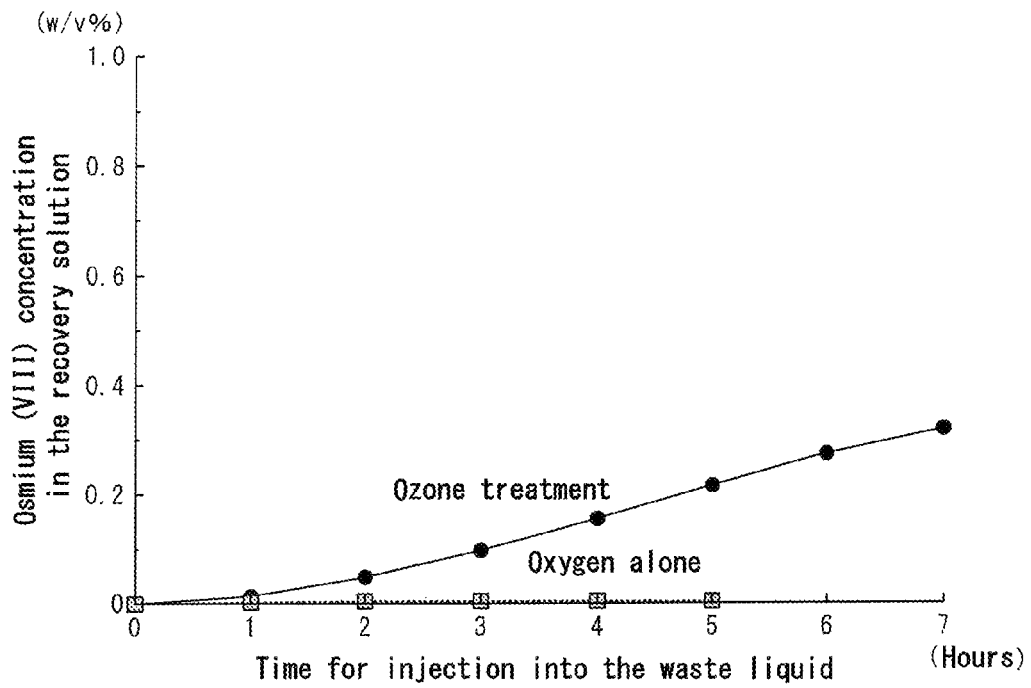
FIG. 5 is a diagram showing the effects of ozone treatment on the osmium waste liquid.

Under the operation conditions as described above, a comparison was made between the case when ozone-containing oxygen made by the ozone generator was injected (hereinbelow referred to as "ozone-treated") and the case when only oxygen was injected without using ozone generator. The concentration of osmium (VIII) oxide in the recovery solution over the time course of injection is shown in FIG. 5.

In the ozone-treated case, the concentration of osmium (VIII) oxide increased over the time course of injection into the waste liquid, confirming that osmium (VIII) oxide was recovered by ozone treatment. The wasted liquid turned from black to transparent, demonstrating a decrease in osmium content.

Working Example 2

Temperature of the Waste Liquid

Figure 6:
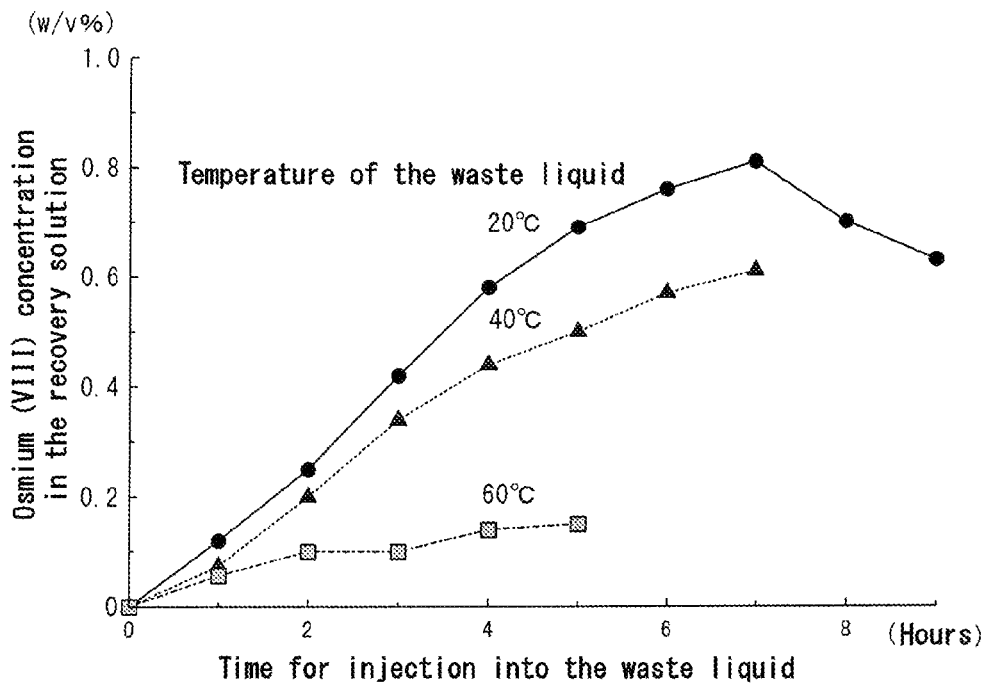
FIG. 6 is a diagram showing the influences of temperature of the waste liquid.

Under the conditions in Working Example 1, the waste liquid was maintained at either 20° C., 40° C., or 60° C., each was ozone-treated to regenerate osmium (VIII) oxide. FIG. 6 shows osmium (VIII) oxide concentration in the recovery solution over the time course of ozone injection into the waste liquid.

The concentration of osmium (VIII) oxide in the recovery solution decreased with increasing the temperature of the waste liquid. Also, it was confirmed that osmium (VIII) oxide in the recovery solution tends to decrease after 7 hours even if the temperature of the waste liquid was at 20° C.

Working Example 3

Post-Transparency Temperature of the Waste Liquid

Figure 7:
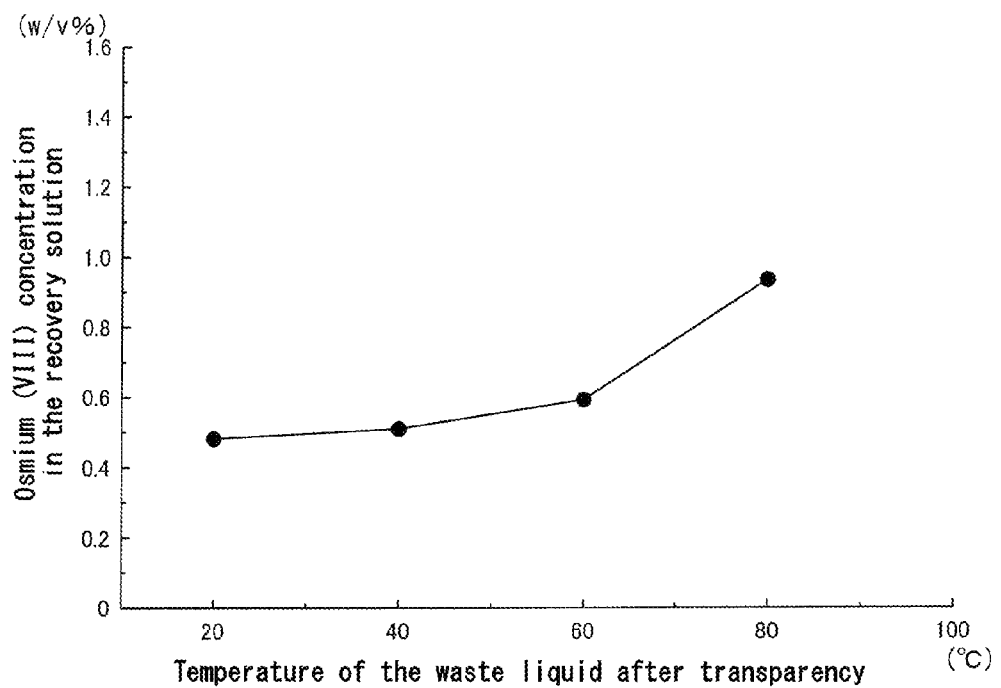
FIG. 7 is a diagram showing the influences of post-transparency temperature of the waste liquid.

Under the conditions in Working Example 2, the waste liquid was treated with ozone at 20° C. for no more than 7 hours until it reaches transparency, then the waste liquid was maintained at either 40° C., 60° C. or 80° C. for 30 minutes. The concentration of osmium (VIII) oxide in the recovery solution is shown in FIG. 7.

After transparency, the concentration of osmium (VIII) oxide in the recovery solution increased with increasing temperature of the waste liquid.

Working Example 4 pH of the Waste Liquid

Figure 8:
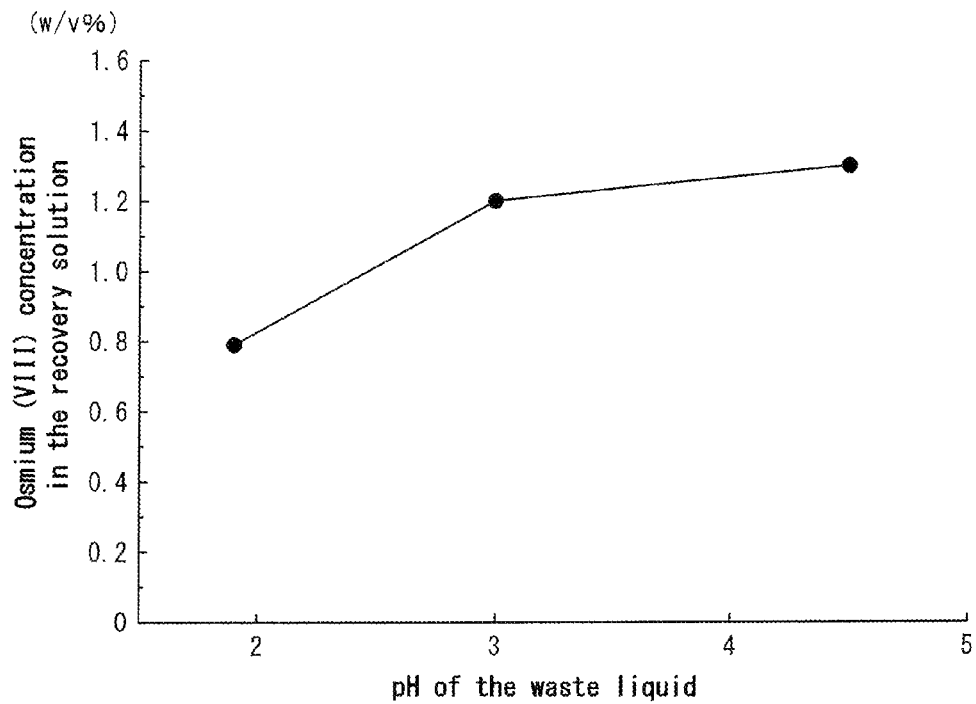
FIG. 8 is a diagram showing the pH of the waste liquid and osmium concentration in the recovery solution.
Figure 9:
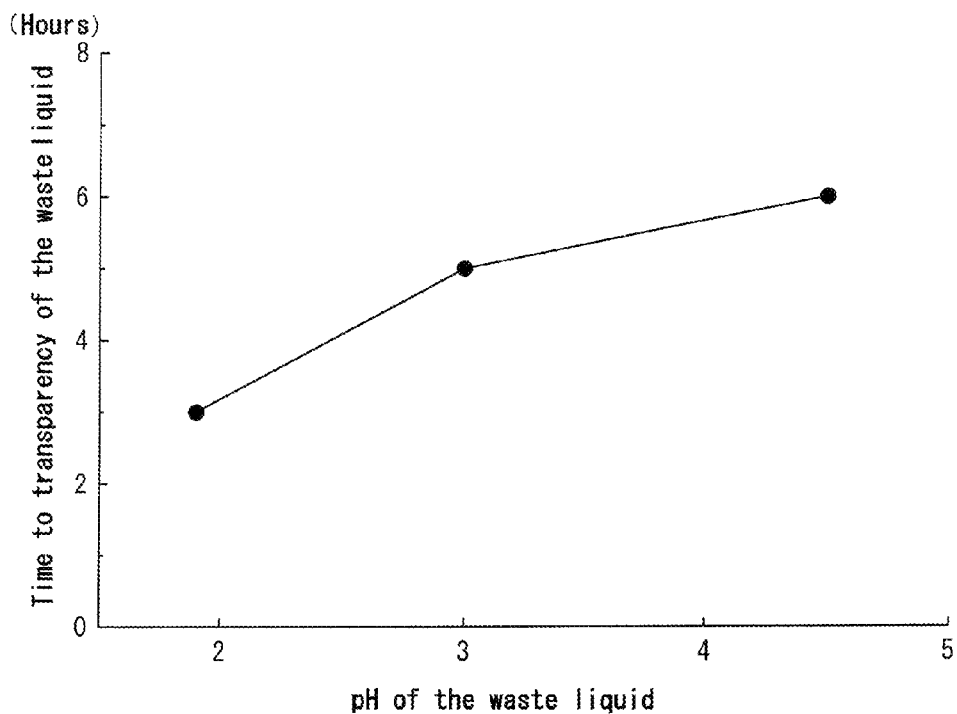
FIG. 9 is a diagram showing the pH of the waste liquid and the time to transparency.

Under the conditions in Working Example 3, the waste liquid was acidified with sulfuric acid and its pH was varied. The waste liquid was ozone-treated at 20° C. with the oxygen flow=1 L/min (ozone yield=5 g/hour) for no more than 7 hours until it reaches transparency, then the oxygen flow was reduced to 0.5 L/min (ozone yield=2 g/hour) before heating at 70° C. or higher for 1 hour or longer. The concentration of osmium (VIII) oxide in the recovery solution against the pH of the waste liquid and time to transparency of the waste liquid against the pH of the waste liquid are shown in FIG. 8 and FIG. 9, respectively.

It was demonstrated that osmium (VIII) oxide concentration decreased in acidic condition though time to transparency was shortened.

Working Example 5

Alkaline Concentration in the Recovery Solution

Under the conditions in Working Example 4, pH of the waste liquid was adjusted at 2, and alkaline concentration in the recovery solution was changed by varying the amount of 1 N sodium hydroxide added before ozone treatment. The concentration of osmium oxide (VIII) in the recovery solution against the amount of 1 N sodium hydroxide added is shown in FIG. 10.

Figure 10:
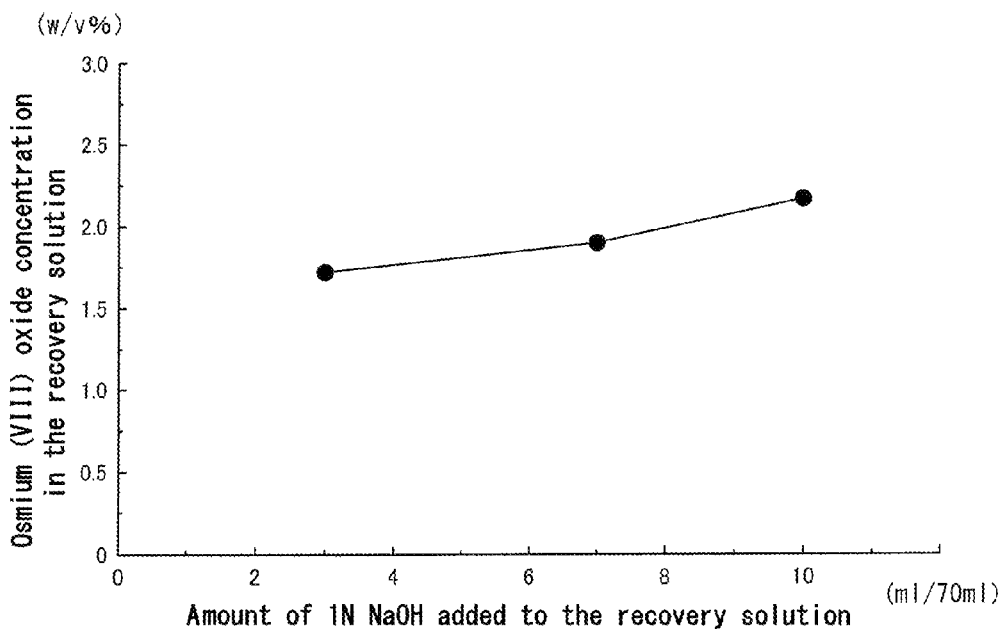
FIG. 10 is a diagram showing the influences of sodium hydroxide concentration in the recovery solution.

FIG. 10 confirms that osmium (VIII) oxide concentration in the recovery solution increased with increasing sodium hydroxide concentration.

Working Example 6 pH of the Recovery Solution

Under the operation conditions in Working Example 5, pH of the recovery solution is in a range from 7 to 10 after the termination of the step of generating osmium (VIII) oxide. This pH was not altered from 7.4 even by the addition of phosphate buffer pH 7.4 at 50%

Working Example 7

Temperature of the Recovery Solution

Figure 11:
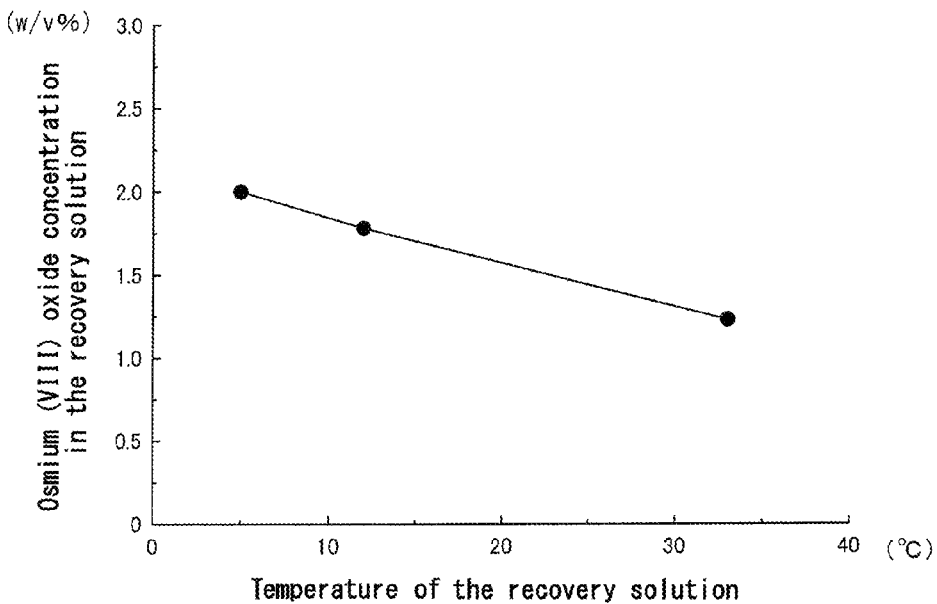
FIG. 11 is a diagram showing the influences of the temperature of the recovery solution.

To the recovery solution 0.1 N sodium hydroxide was added and the temperature of the recovery solution was varied. After being adjusted to pH 2 the waste liquid was treated with ozone at 20° C. and with an oxygen flow=1 L/min (ozone yield=5 g/hour) for no more than 7 hours until it reaches transparency, then the oxygen flow was reduced to 0.5 L/min (ozone yield=2 g/hour) before heating at 70° C. or higher for 1 hour or longer. The temperature of the recovery solution was varied. The concentration of osmium (VIII) oxide in the recovery solution against the temperature of the recovery solution is shown in FIG. 11.

The concentration of osmium (VIII) oxide in the recovery solution increased with decreasing temperature of the recovery solution.

Working Example 8

Method of Concentrating the Waste Liquid

Figure 12:
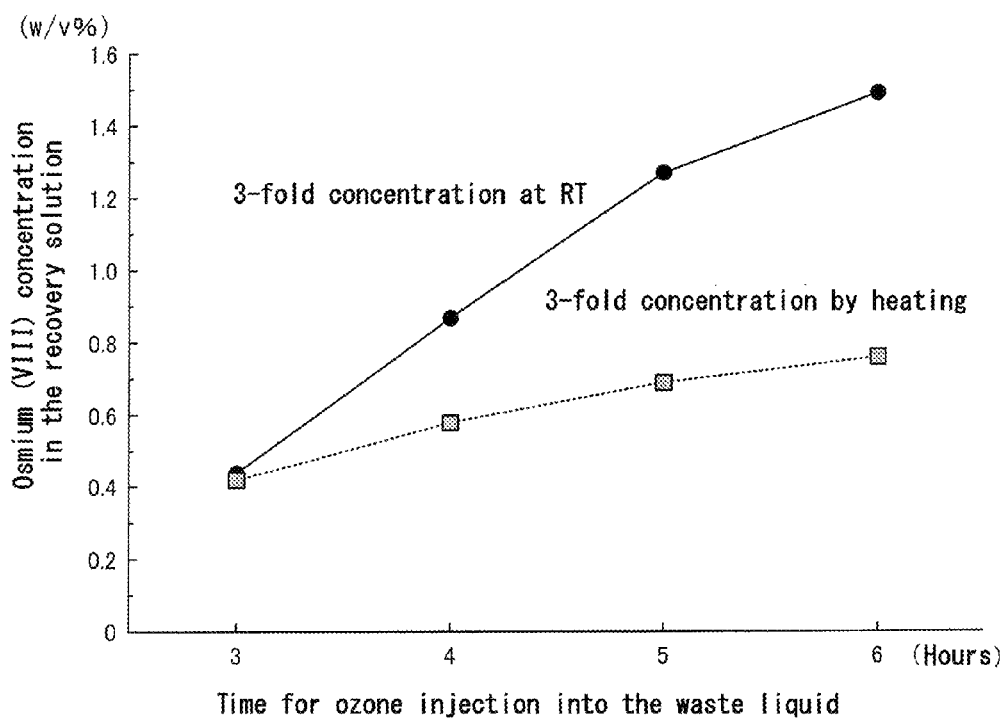
FIG. 12 is a diagram showing the influences of concentrating method.

The waste liquid was concentrated about threefold by evaporating water content either by heating or at room temperature. The concentrated waste liquid was treated with ozone. For a method of concentrating the waste liquid at room temperature, it was placed in a shallow and broad container like a dish, left at room temperature inside a fume hood where water content was evaporated by the wind therein. 10 L of the waste liquid became about 3 L after 5 days. Under the conditions as described above, both of the waste liquid concentrated at room temperature and the waste liquid concentrated by heating were used. To the recovery solution 0.1 N sodium hydroxide was added and cooled on ice to 5° C. or below. After adjusting to pH 2, the waste liquid was treated with ozone at 20° C. with an oxygen flow=1 L/min (ozone yield=5 g/hour) for no more than 7 hours until it reaches transparency, then the oxygen flow was reduced to 0.5 L/min (ozone yield=2 g/hour) before heating at 70° C. or higher for 1 hour or longer. The concentration of osmium (VIII) oxide in the recovery solution is shown in FIG. 12.

The waste liquid concentrated by heating did not turn to transparent by ozone treatment, and the concentration of osmium (VIII) oxide in the recovery solution did not reach at 1 w/v %. On the other hand, in the case of that concentrated at room temperature osmium (VIII) oxide concentration was over 1 w/v % only by ozone treatment. Similar results was obtained by precipitating the waste liquid using a polymer coagulant and dissolving the precipitate in water before treating with ozone.

Working Example 9

Amount of Injected Ozone

Figure 13:
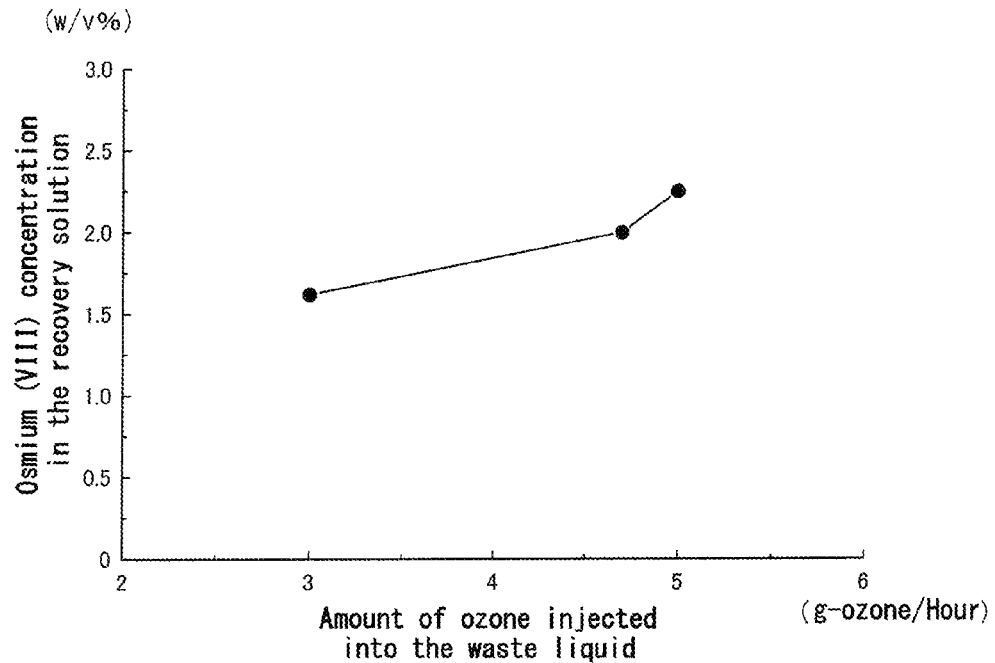
FIG. 13 is a diagram showing the influence of the amount of injected ozone.

The waste liquid used was concentrated at room temperature. To the recovery solution 0.1 N sodium hydroxide was added and cooled on ice to 5° C. or below. After being adjusted to pH 2 the waste liquid was treated with ozone at 20° C. with varying oxygen flow from 0.6 to 1.5 L/min (ozone yield varies from 3 to 5.1 g/hour) for no more than 7 hours until it reaches transparency, then the oxygen flow was reduced to 0.5 L/min (ozone yield=2 g/hour) before heating at 70° C. or higher for 1 hour or longer. The concentration of osmium (VIII) oxide in the recovery solution is shown in FIG. 13. It was confirmed that the concentration of osmium (VIII) oxide in the recovery solution increases by increasing the amount of injected ozone.

Working Example 10

Waste Liquid Concentration

Figure 14:
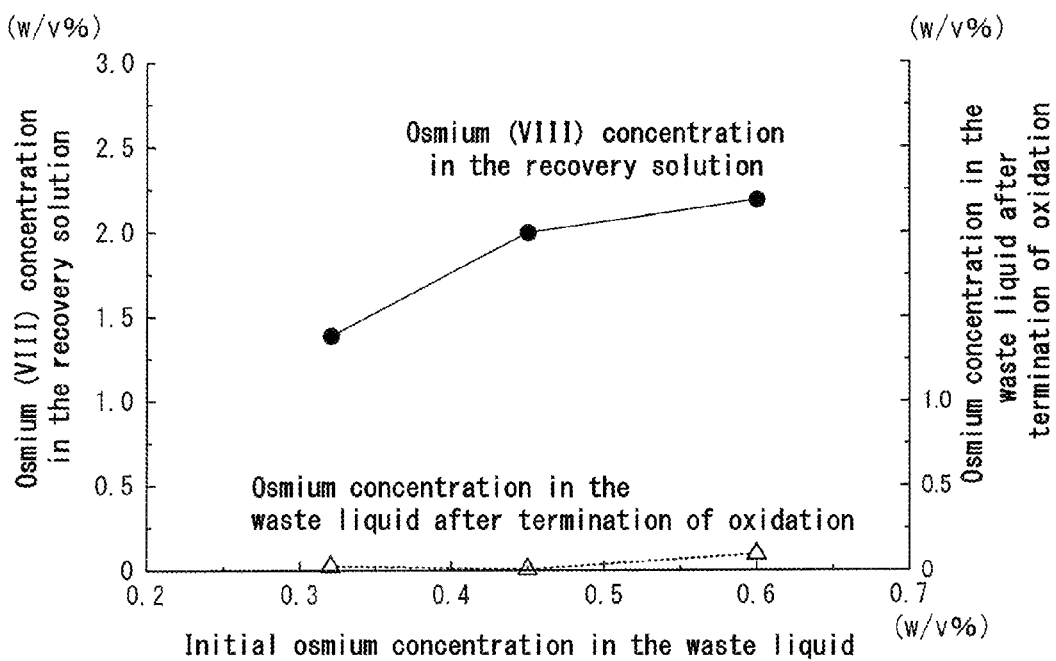
FIG. 14 is a diagram showing the influence of the osmium concentration in the waste liquid.

The osmium concentration in the waste liquid that is to be placed into the reaction bottle was varied. To the recovery solution 0.1 N sodium hydroxide was added, ice-cooled to 5° C. or below. After being adjusted to pH 2 the waste liquid was treated with ozone at 20° C. with an oxygen flow of 1 L/min (ozone yield=5 g/hour) for no more than 7 hours until it reaches transparency, then the oxygen flow was reduced to 0.5 L/min (ozone yield=2 g/hour) before heating at 70° C. or higher for 1 hour or longer. Osmium concentration in the waste liquid and osmium (VIII) oxide concentration in the recovery solution are shown in FIG. 14.

Although osmium (VIII) oxide concentration in the recovery solution increases with increasing osmium concentration in the waste liquid, more osmium remain in the waste liquid after the termination of the step when the osmium concentration of the waste liquid exceeds 0.5 w/v %.

Working Example 11

Figure 15:
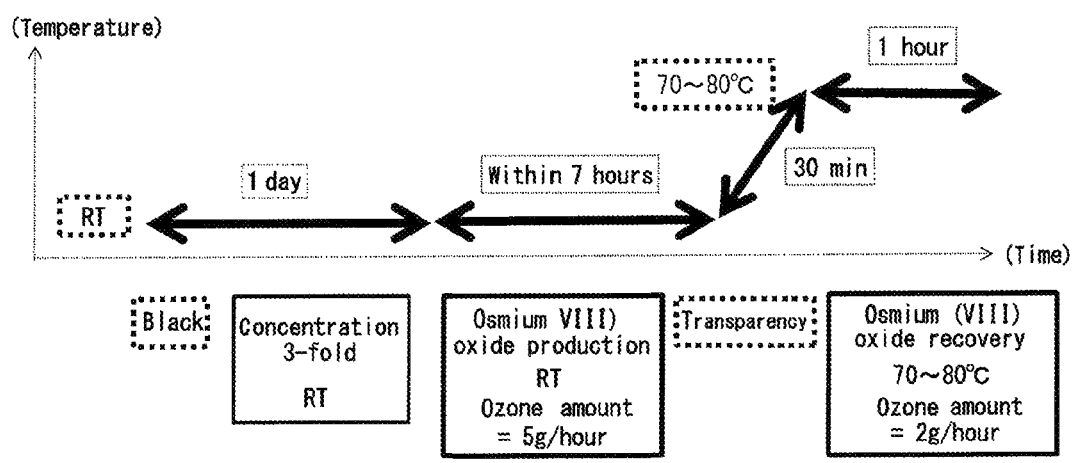
FIG. 15 is a flow diagram of the steps in Working Example 11.

Regeneration of Osmium (VIII) Oxide Solution According to a Suitable Embodiment of the Present Invention The regeneration system shown in FIG. 2 was used. The waste liquid containing osmium was concentrated about threefold by evaporation at room temperature, of which 300 ml was placed in a 500 ml gas-cleaning bottle, and pH was adjusted to 2 with sulfuric acid. For a recovery solution, 70 ml of approximately 0.1 N sodium hydroxide solution was placed in a 125 ml gas-cleaning bottle, cooled in ice to 5° C. or below. Cleaning part A and cleaning part B was filled with water. A highly functional ozone generator manufactured by HAMANETSU Co., Ltd. was used to inject oxygen at a flow rate=1 L/min (ozone yield=5 g/hour). When the waste liquid reached transparency at room temperature within 7 hours, oxygen flow was reduced to 0.5 L/min (ozone yield=2 g/hour) before heating at 70° C. or higher for 1 hour or longer. The flow of steps is shown in diagram in FIG. 15.

Table 1 shows the recovery rate of osmium estimated before and after ozone treatment.

TABLE 1

| | | Waste liquid | Wash liquid | Recovery solution | Wash liquid | Total amount of osmium (g) |
|---|---|---|---|---|---|---|
| | | \multicolumn{4}{c}{Liquid volume (ml)} | |
| | | 300 | 150 | 70 | 150 | |
| Before treatment | osmium conc. (w/v %) | 0.48 | — | — | — | — |
| | osmium amount (g) conc. x liquid volume | 1.44 | — | — | — | 1.44 |
| After treatment | osmium conc. (w/v %) | 0.027 | 0.031 | 1.64 (2.19 w/v % as OsO4) | 0.015 | — |
| | osmium amount (g) conc. x liquid volume | 0.081 | 0.047 | 1.15 | 0.023 | 1.30 |

The concentration of osmium (VIII) oxide in the recovery solution was over 2 w/v % and the recovery rate as osmium was 90%. Also, the concentration of osmium which remained in the waste liquid was 0.05 w/v % (500 mg/L) or lower. At this concentration, it is possible to treat the waste liquid by commonly employed coagulating sedimentation, and there will be little volatilization of osmium (VIII) oxide during the treatment.

Working Example 12

Reuse of the Recovery Solution

Figure 16:
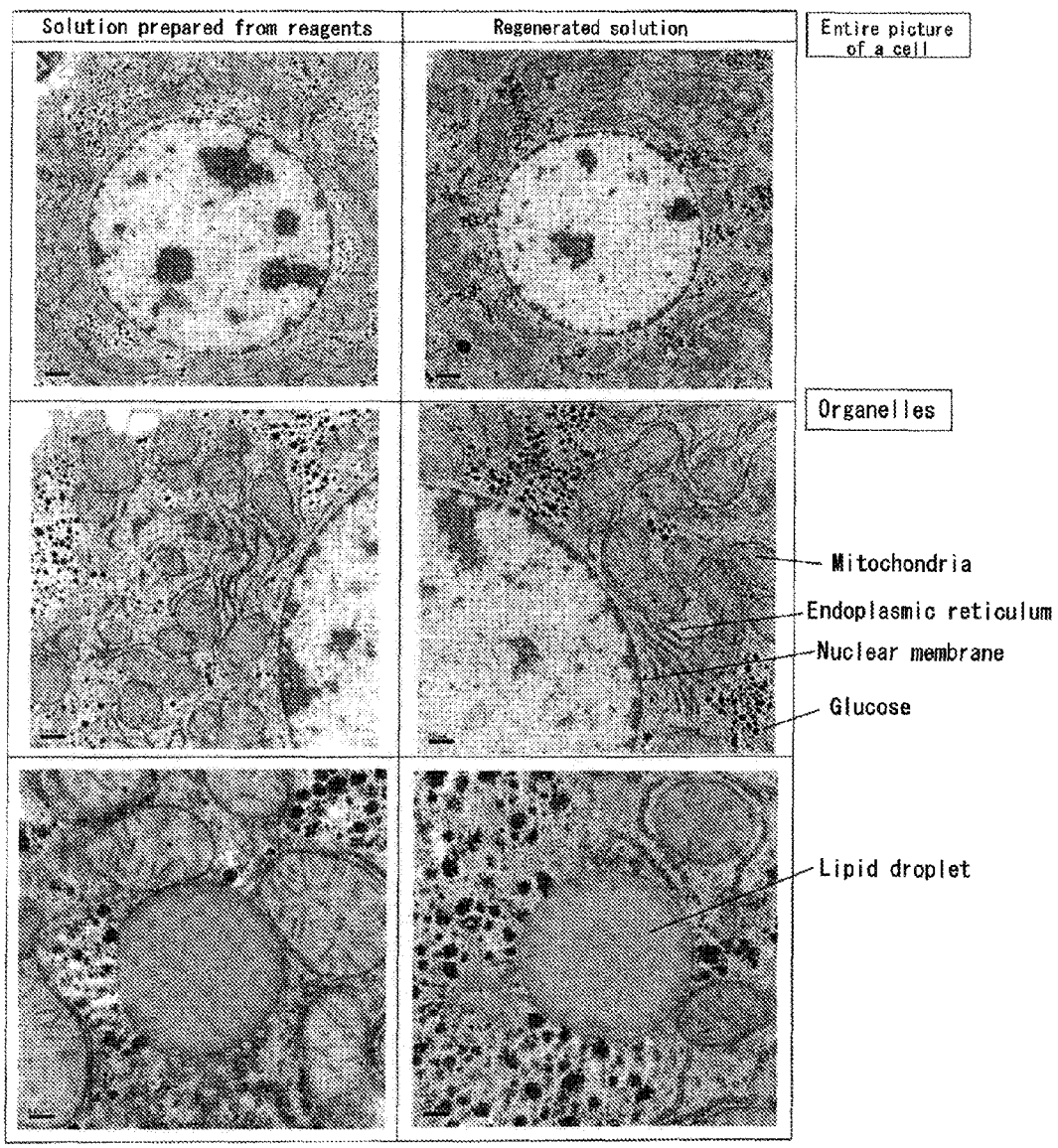
FIG. 16 is a diagram showing the results of electric microscopy imaging using either the osmium (VIII) oxide composition produced according to the present invention or commercial osmium (VIII) oxide solution.

To 2 w/v % osmium (VIII) oxide solution recovered in Working Example 11, phosphate buffer pH 7.4 was added at 50% and this was used for fixation and staining of hepatic tissue sample of a normal mouse. The results of imaging by the transmission electric microscopy are shown in FIG. 16. Standards for assessing images are as follows: the image of the membrane has a contrast; there is no break site; and there is no missing of organelle in the image.

As shown in FIG. 16, cells were stained using the osmium (VIII) oxide solution of the present invention in equal level to the results obtained using the osmium (VIII) oxide solution prepared from commercially available reagent. Sufficient contrast for observation was also obtained.

EXPLANATION OF NUMERALS

101 Oxidation gas supplying part
102 Oxidation part
103 Recovery part
104 Oxygen bomb
105 Ozone generator
106 Bottle for backflow prevention
107 Reactor
108 Cleaning part A
109 Recovery bottle
110 Cleaning part B
111 Heating system
112 Temperature controlling system
113 Oxygen bomb
114 Ozone generator
115 Bottle for backflow prevention
116 Reactor
117 Cleaning part A
118 Recovery bottle
119 Cleaning part B

The invention claimed is:

1. A method of regenerating osmium (VIII) oxide solution, comprising
    a step of oxidizing a waste liquid containing osmium and organic materials using ozone to produce osmium (VIII) oxide gas, wherein the oxidizing temperature is set firstly in a range from 10° C. to 40° C., and secondly in a range from 60° C. to 100° C., and
    a step of introducing the gas into a recovery solution.
2. The method according to claim 1, wherein the recovery solution is alkaline.
3. The method according to claim 2, wherein the temperature of the recovery solution is below room temperature.

* * * * *